No. 665,420. Patented Jan. 8, 1901.
J. P. F. FLAIG.
WINDMILL.
(Application filed May 26, 1899. Renewed Sept. 4, 1900.)
(No Model.) 5 Sheets—Sheet 1.
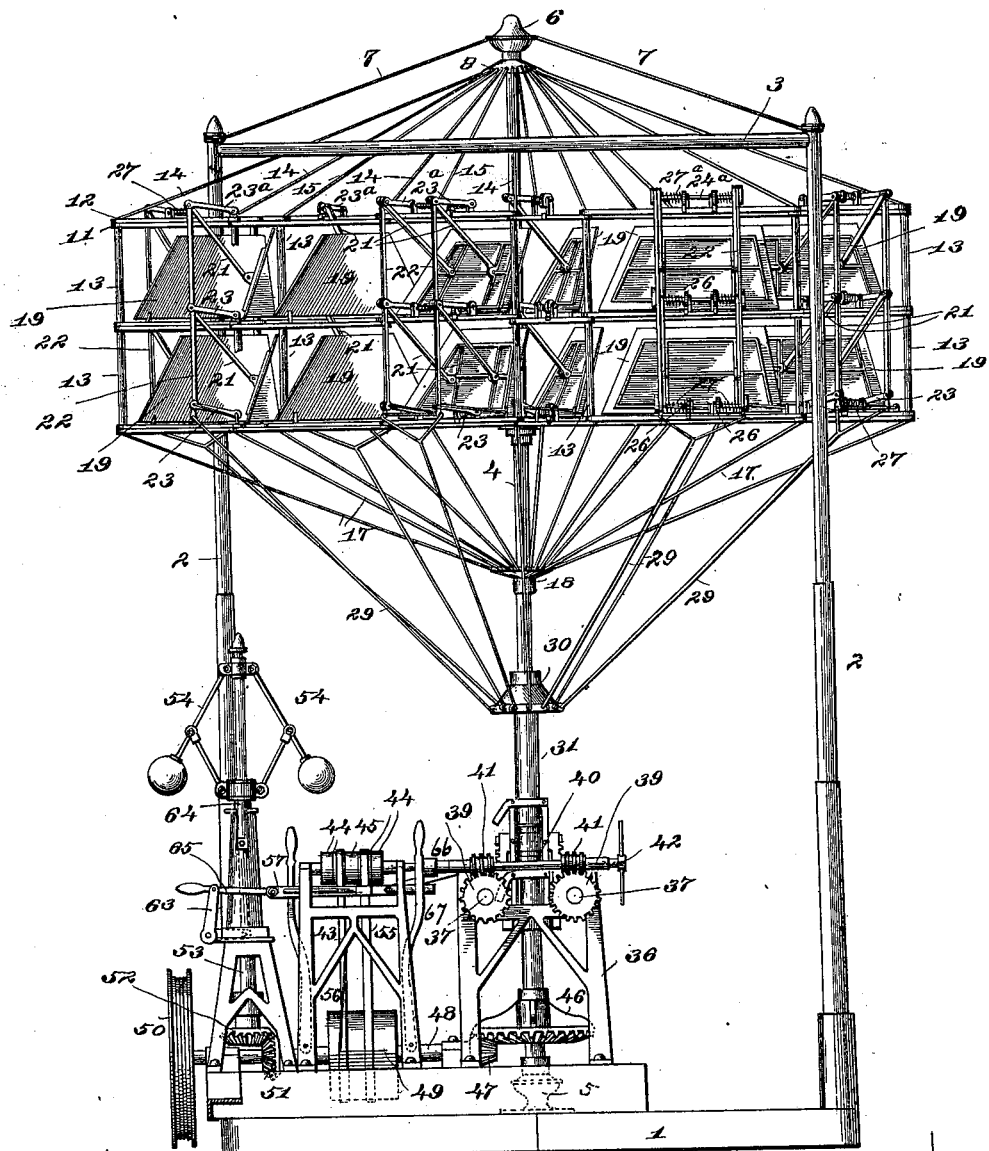
Witnesses
Inventor
Jos. P. F. Flaig
By Knight Bro.
Attorneys No. 665,420. Patented Jan. 8, 1901.
J. P. F. FLAIG.
WINDMILL.
(Application filed May 26, 1899. Renewed Sept. 4, 1900.)
(No Model.) 5 Sheets—Sheet 2.
Fig. II.
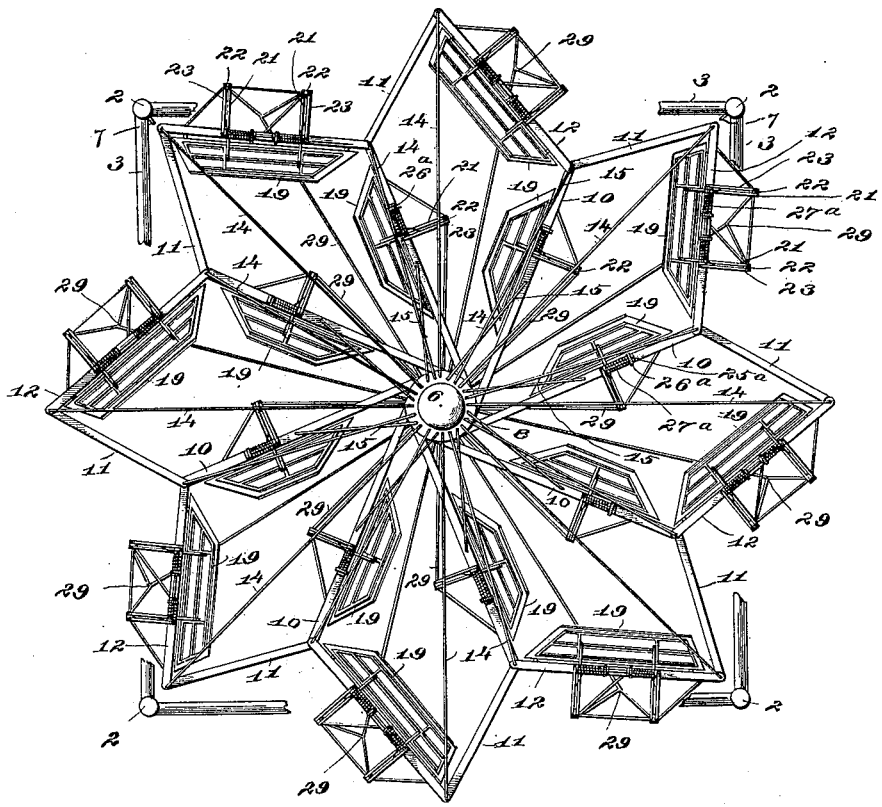
Fig. III.
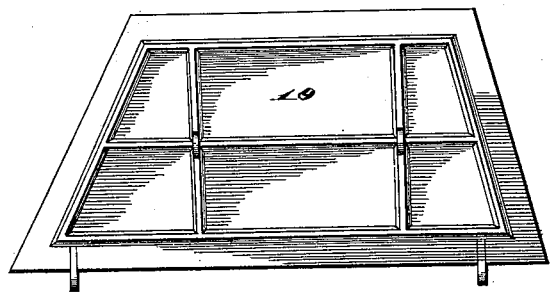

No. 665,420. Patented Jan. 8, 1901.
J. P. F. FLAIG.
WINDMILL.
(Application filed May 26, 1899. Renewed Sept. 4, 1900.)
(No Model.) 5 Sheets—Sheet 3.
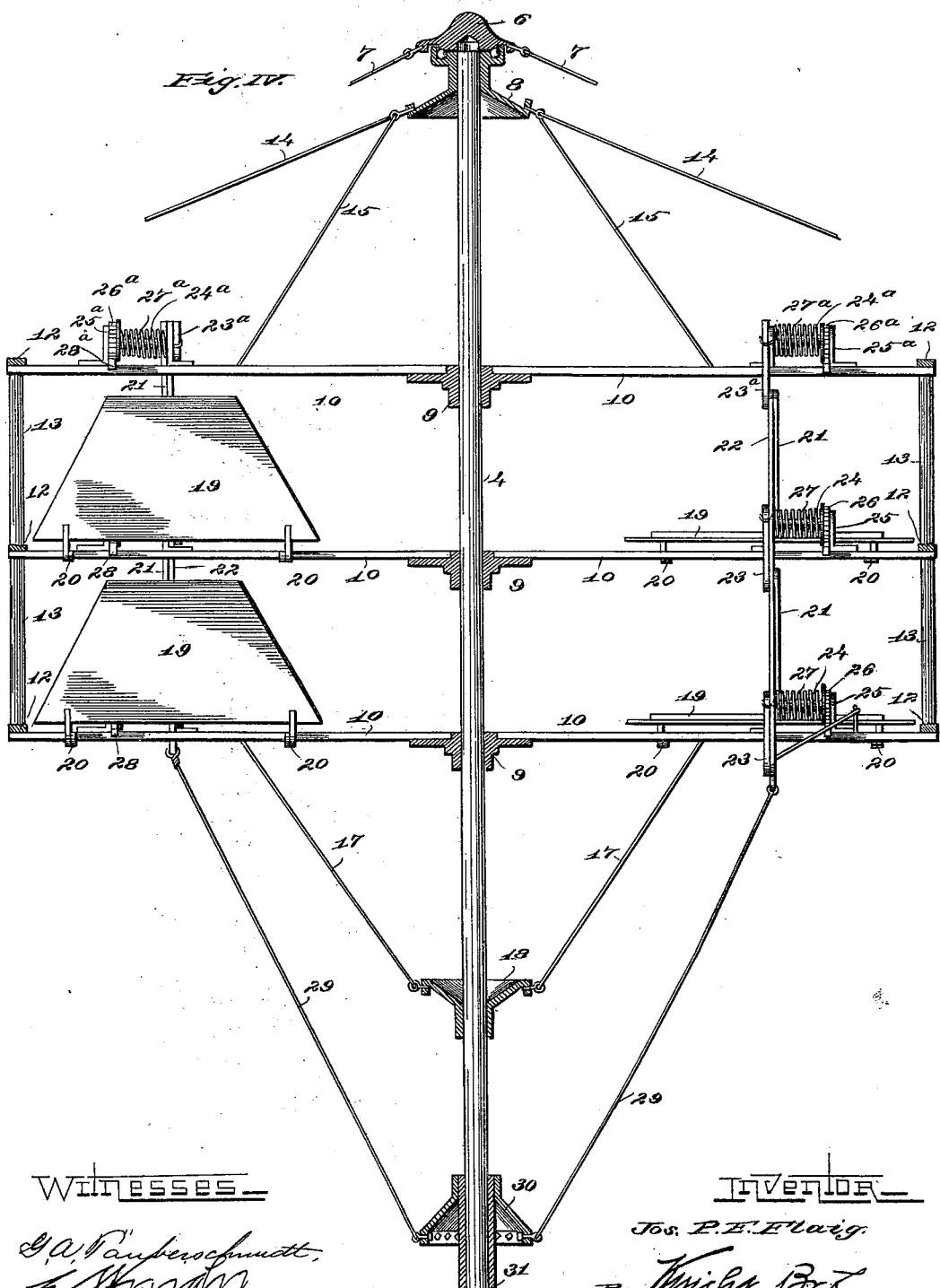

No. 665,420. Patented Jan. 8, 1901.
J. P. F. FLAIG.
WINDMILL.
(Application filed May 26, 1899. Renewed Sept. 4, 1900.)
(No Model.) 5 Sheets—Sheet 4.
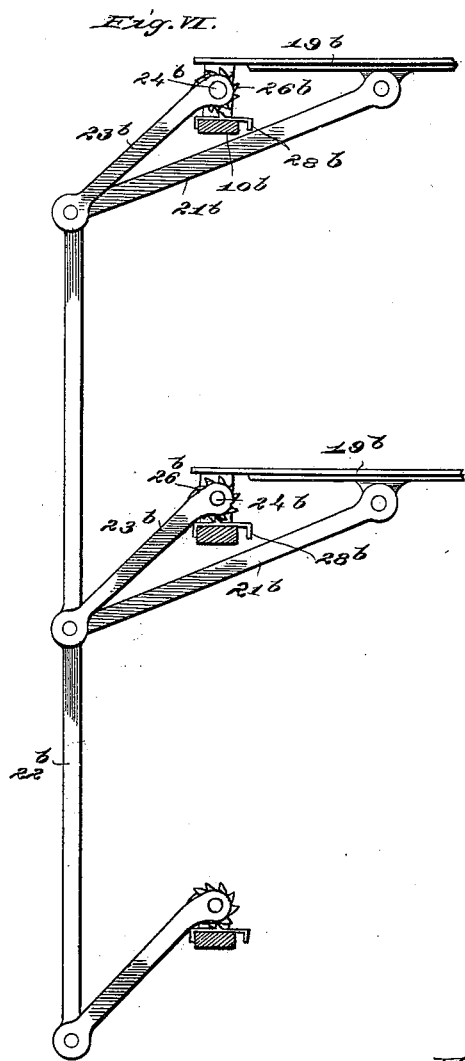
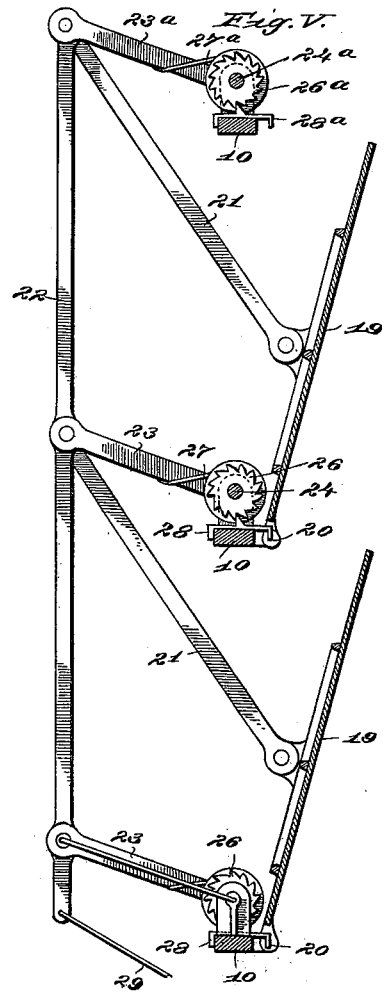
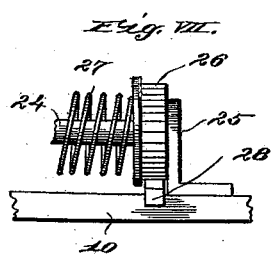
Witnesses
Inventor
Jos. P. F. Flaig.
By Knight Bro'
Attorneys

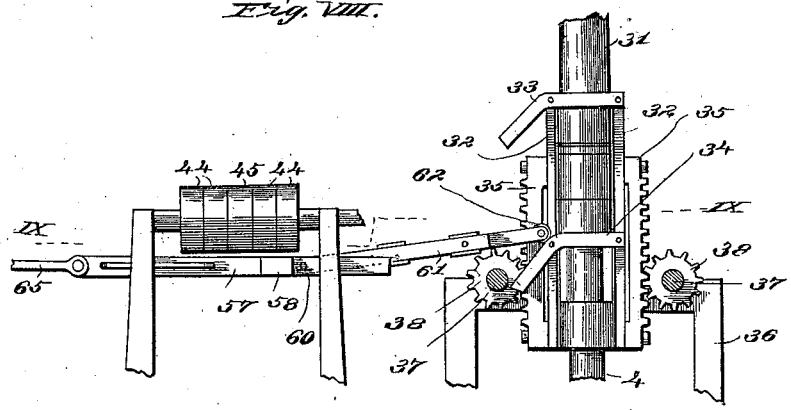

UNITED STATES PATENT OFFICE.

JOSEPH P. F. FLAIG, OF ST. LOUIS, MISSOURI.

WINDMILL.

SPECIFICATION forming part of Letters Patent No. 665,420, dated January 8, 1901.

Application filed May 26, 1899. Renewed September 4, 1900. Serial No. 29,023. (No model.)

*To all whom it may concern:*

Be it known that I, JOSEPH P. F. FLAIG, a citizen of the United States, residing at the city of St. Louis, in the State of Missouri, have invented certain new and useful Improvements in Windmills, of which the following is a full, clear, and exact description, reference being had to the accompanying drawings, forming part of this specification.

My invention relates to that class of windmills known as "horizontal," such as is shown and described in my Patent No. 590,753, granted September 28, 1897. The present improvement has reference particularly to the sail-operating arrangement, including the controlling mechanism.

My invention consists in features of novelty hereinafter fully described, and pointed out in the claim.

Figure I is a view in side elevation of the windmill. Fig. II is a top view. Fig. III is a face view of one of the sails. Fig. IV is an enlarged sectional view taken centrally through the upper portion of the windmill and showing parts of the sail-carrying frames and sustaining-rods in elevation. Fig. V is an enlarged detail view showing a pair of sails elevated and in section and the controlling parts in elevation. Fig. VI is a view of a modified construction in which the sails are adapted to be moved downwardly in throwing them to the wind instead of upward, as in the construction shown in Fig. V. Fig. VII is a detail view in elevation of the ratchet and spring by which the adjustment of the sails is controlled. Fig. VIII is a detail view, in front elevation, of the sail-governing device, partly in section, taken on the line VIII VIII, Fig. IX. Fig. IX is a view in horizontal section taken on the line IX IX, Fig. VIII. Fig. X is a detail side view of the movable sleeve and rack of the governing device.

1 designates the base of the windmill, on which vertical posts 2 are supported, the said posts being connected at their upper ends to cross-bars 3.

4 designates the upright revoluble shaft, mounted in a bearing 5 at its lower end and in a box 6 at its upper end. The box 6 is sustained by stay-rods 7, that connect it to the frame-posts 2. The box 6 is provided with a downwardly and outwardly extending flange-rim 8, surrounding the shaft 4.

9 designates collars fixed to the shaft 4. Secured to these collars are frame-arms 10, arranged in series and extending tangentially from the shaft 4, each arm 10 being provided with an oblique extension 11. The extensions 11 of the arms 10 are joined throughout by connecting-links 12. The frames, composed of the arms 10, their extensions 11, and connecting-links 12, may be of any suitable number, and they are joined throughout by vertical rods 13. I have shown three of such frames, which are adapted to support two sets of sails, as will hereinafter appear. The sail-frames are supported through their extent by stay-wires 14 and 15, connected to the flange-rim 8 and at inner and outer portions to the frame-arms.

17 designates stay-wires connected to the sail-frames and to the collar 18, fixed to the shaft 4.

19 designates the sails, pivoted at 20 to the frame-bars.

21 designates links pivoted to the sails 19 at their backs, the opposite ends of said links being pivoted to connecting-rods 22, that extend from top to bottom of the sail-frames and join the links of each tier of sails. 23 designates a second set of links, each pivotally joined at their outer ends to the connecting-bars 22.

24 designates shafts mounted in supports 25 on the frame-bars 10 and their connections. The inner ends of the links 23 are fixed to these shafts 24. Rigidly mounted on the shafts 24 are ratchet-wheels 26. Surrounding the shafts 24 are coil-springs 27, one end of each of which is fixed to a ratchet-wheel 26, while the opposite end of each spring extends to the link 23, carried by the shaft mentioned, and is bent into engagement with said link, as clearly shown in Fig. V. The ratchet-wheels 26 are controlled by sliding pawls 28, (see Fig. V,) the object of said wheel being to provide means for the adjustment of the spring 27 to increase or diminish the degree of tension according to requirement, so that they will act effectually to hold the sails slightly above a horizontal plane in order that the wind may readily gain access beneath them to effect their elevation in practical operation of the windmill. The tension of the springs 27 is obtained by turning the ratchet-wheels 26, so as to twist the said springs. Such turning may be accomplished by the use of any suitable implement. It will be observed that the pawls 28 are provided with downturned lips and that these pawls are of greater length than the width of the frame-arms 10, on which they are mounted, consequently normally leaving a space between the said frame-arms and the projecting right-hand ends of the pawls, as illustrated in Fig. V. As each pawl is provided with a prong that engages the teeth of the ratchet-wheel, it is obvious that this prong is maintained in the position shown in Fig. V by the tension of the springs 27, which tends to effect a retrograde movement of the ratchet-wheel. When, however, the degree of tension of the spring 27 is to be increased or lessened, the pawl 28 is carried toward the left of the position that is seen in Fig. V, thereby bringing the pawl-lip at the right-hand end, previously occupying the position seen in Fig. V, against the frame-arm 10 and moving the pawl-prong out of engagement with the ratchet-wheel, so that said wheel may be turned in either direction at will. When the desired tension has been arrived at, the pawl is moved back into its former position, and the ratchet-wheel teeth engaging it the said wheel is prevented from retrograde movement.

23ª designates auxiliary links connected to auxiliary shafts 24ª, having ratchet-wheels 26ª, these auxiliary links receiving the connection of the upper links 21 and serving to balance the upper series of sails.

In Fig. VI, I have shown the sails 19ᵇ connected to the links 21ᵇ 23ᵇ and connecting-rods 22ᵇ in such manner that the sails are adapted to move downwardly into vertical position instead of upwardly, as is the case in the construction illustrated in detail in Fig. V.

The lower ends of the link-connecting rods 22 have connected to them wires or ropes 29, that lead to a collar 30, carried by the sleeve 31, loosely fitted to the shaft and adapted to move vertically thereon.

Secured to the sleeve 31 is a pair of vertical plates 32, that carry inclined fingers 33 and 34. Mounted on the sleeve 31 is a pair of vertical racks 35.

36 designates a frame located at the base of the shaft 4, in which a pair of horizontal shafts 37 are mounted at opposite sides of the vertical shaft. On the shaft 37 are pinions 38, that engage the teeth of the racks 35.

39 designates worm-wheels also mounted on the shafts 37.

40 designates a worm-carrying shaft supported at right angles to the shafts 37 and provided with worms 41, arranged to engage the worm-wheels 39. The worm-carrying shaft 40 is provided at one end with a hand-wheel 42 and at its opposite end is mounted in a frame 43.

44 designates loose pulleys mounted on the shaft 40 in pairs, and between the two pairs of loose pulleys is a central tight pulley 45.

Fixed to the lower end of the vertical shaft 4 is a bevel gear-wheel 46, arranged to mesh with a bevel-pinion 47 on a shaft that carries a band-pulley 49. The outer end of the shaft 48 carries a driving-pulley 50.

51 is a bevel-pinion on the shaft 48, arranged to mesh with a bevel-pinion 52, carried by a governor-shaft 53, equipped with governor-arms 54.

55 designates a straight belt, and 56 a crossed belt, both of which are arranged on the band-pulley and adapted to travel on either of the loose pulleys 44 or tight pulley 45.

57 designates a belt-shifter provided with a guide 58, adapted to receive the straight belt 55, and a guide 59, adapted to receive the crossed belt 56.

Pivoted at 60 to the shifter 57 is an adjustable shifting-bar 61, provided at its free end with a roller 62. The free end of the shifting-bar 61 is arranged over the shaft 37 and is adapted to be engaged by the inclined fingers 33 and 34 in the movement of the sleeve 31. These fingers 33 and 34 are of service in controlling the extreme movement of the sleeve 31 in either direction by acting on the belt-shifter 57 61 to effect the stoppage of the shaft 40, as will be hereinafter explained.

63 designates a bell-crank, one end of which is connected to a movable sleeve 64, surrounding the governor-shaft 53, and adapted to be moved by the governor-arms 54 when said arms are spread in high speed of their rotation. The opposite end of the bell-crank 63 is connected to a link 65, pivoted to the belt-shifter 57.

In the practical use of this windmill the sails are upheld slightly from a horizontal plane by the springs 27, so as to allow the wind to gain a purchase beneath them to throw them toward vertical positions, where they receive the direct force of the wind. The proper adjustment of the sails is regulated by the ratchets 26. The wind acting against the sails causes them, their carrying-frames, and the shaft 4 to revolve as a whole, and in such movement the bevel-gear 46 at the lower end of the shaft is turned and imparts movement to the shaft 48, the band-pulley 49, the driving-pulley 50, and the governor-shaft 53. As the speed of the shaft 4 increases the governor-arms 54 are spread, elevating the sleeve 64 thereon. In the movement of the sleeve 64 the bell-crank 63 is rocked to move the link 65, and consequently the belt-shifter 57. In such action the belt-shifter is carried outwardly when the governor-arms are completely spread, and the straight belt 55 is moved onto the central tight pulley 45, carried by the shaft 40, thereby causing the shaft 40 to be revolved in a forward direction, turning the worms 41 therewith. The worms 41 impart their movement to the worm-wheels 39 and to the pinions 38, carried on the same shafts with said worm-wheels. In this instance the pinions 38 mesh with the racks 35, causing the sliding sleeve 31 to be drawn downwardly, thereby effecting a strain upon the wires or ropes 29, forming connection to the connecting-bars 22. In the downward movement of the connecting-bars 22 the sails 19 are thrown toward the horizontal, thereby altering the positions of the sails and limiting the extent of purchase of the wind thereagainst. As soon as the speed of the mill has been reduced to the proper degree the governor-arms 54, approaching an unspread condition, cause the belt-shifter to be moved in reverse direction, and the straight belt 55 is moved off the tight pulley 45 into its former position. When the windmill is to be put into operation, the sails are of course in closed position—that is to say, they are only slightly elevated from the horizontal, as explained. 66 designates a clutch connecting the shaft 40. The clutch 66 is then shifted by moving the lever 67 so as to release the portion of the sectional shaft 40 carrying the worms 41 from the continuation of the same shaft carrying the pulleys 44 and 45. The hand-wheel 42 on the shaft 40 is then turned, communicating movement through the worms 41 to the worm-wheels 39, thereby revolving the shafts 37, that carry said worm-wheels, and moving the racks 35 and sliding sleeve 31 upwardly. As the sleeve 31 is moved upwardly the wires or ropes 29 are relieved from downward pull, and as a consequence the sails 19 are gradually freed to move toward vertical positions, being carried upwardly on their pivots by the springs 27 and the force of wind bearing against them. At such times the sails are in position to receive the pressure of the wind, under the influence of which the wheel turns. The clutch 66 is then thrown to engage the two sections of the shaft 40, so as to render such shaft rigid throughout. At this time the governor-arms 54 are in their lowermost positions, and therefore offer the least resistance to the turning of the shafts 4, 48, and 53. As the speed of the mill increases the speed of the shaft 53 is increased until the arms 54 are spread, with the result that the bell-crank 63 is rocked to move the link 65 and the belt-shifter 57, connected thereto, outwardly. The result is that the straight belt 55 is carried from the loose pulley 44 onto the tight pulley 45, thereby causing the shaft 40 to be turned throughout its length to move the sails downwardly in the manner explained by reason of the connection provided by the pinions 38, racks 35, and wires or ropes 29. In the event of the governor-arms 54 approaching approximately a closed position by reason of the lowering operation of the sails, as explained, and the decreased speed of the mill the belt-shifter 57 is moved inwardly, causing the straight belt 55 to be carried from the tight pulley 45 and the crossed belt 56 to be carried onto the tight pulley 45, and thereby turning the shaft 40 in a reverse direction to operate the worms 41 and pinions 39, so that the racks 35 will be moved upwardly, causing the downward strain upon the ropes 29 to be relieved and permitting the pressure of the wind to again elevate the sails. The inclined finger 34 is intended to limit the upward movement of the racks 35 by shifting the belt-shifter when said inclined finger comes in contact with the roller 62 of the belt-shifter, thereby moving the crossed belt 56 off the tight pulley 45 onto the loose pulley 44 and stopping the turning of the shaft 40, thereby avoiding breakage of the racks or pinions, which might otherwise result. When the mill is to be stopped, the link 65 is released from the bell-crank 63 and the belt-shifter is moved to carry the straight belt 55 onto the tight pulley 45, with the result that the shaft 40 will be turned, thereby carrying the racks 35 and their sleeve 31 downwardly to close the sails. When the sails are lowered and the rack has reached the end of its downward movement, the wheel 62, carried by the belt-shifter, is engaged by the inner edge of the inclined finger 33 and the shifter moved toward the shaft 4, thereby carrying the straight belt off of the tight pulley 45 and causing the operation of the shaft 40 to cease, thus cutting out the racks and their connection, causing their movement to cease.

The clutch 66 connects the two parts of the shaft 40, one of which contains the worms 41 and the other of which carries the pulleys 44 and 45. This clutch is manipulated by a lever 67, through means of which the clutch may be thrown to engage both portions of the shaft or may be thrown to release the portion that carries the worms 41 when it is desired to manipulate the hand-wheel 42 to open or close the windmill-sails.

As clearly shown in Fig. II, a portion of the sails 19 are carried by the inner portions of their supporting-frames, while the remainder of the sails are mounted on the outer portions of the frame at angles to the inner set. By this arrangement of the sails I provide for the wind striking against the sails in a much more effective manner than if the sails were arranged in line with each other, owing to the fact that the sails lie in pairs disposed in diverging directions, thereby causing the wind to converge when it strikes the sails and producing a more effective result in its action.

I claim as my invention—

In a horizontal windmill, the combination of a vertical shaft, frames carried thereby comprising inner arm portions and outer portions arranged at angles to said inner arm portions, a set of sails carried by said inner arm portions, and a second set of sails carried by said outer portions at angles to the inner sails, substantially as described.

JOSEPH P. F. FLAIG.

In presence of—
N. V. ALEXANDER,
E. S. KNIGHT.